W. H. BACKUS.
RAKE CLEANER.
APPLICATION FILED SEPT. 24, 1914.
1,158,022.
Patented Oct. 26, 1915.
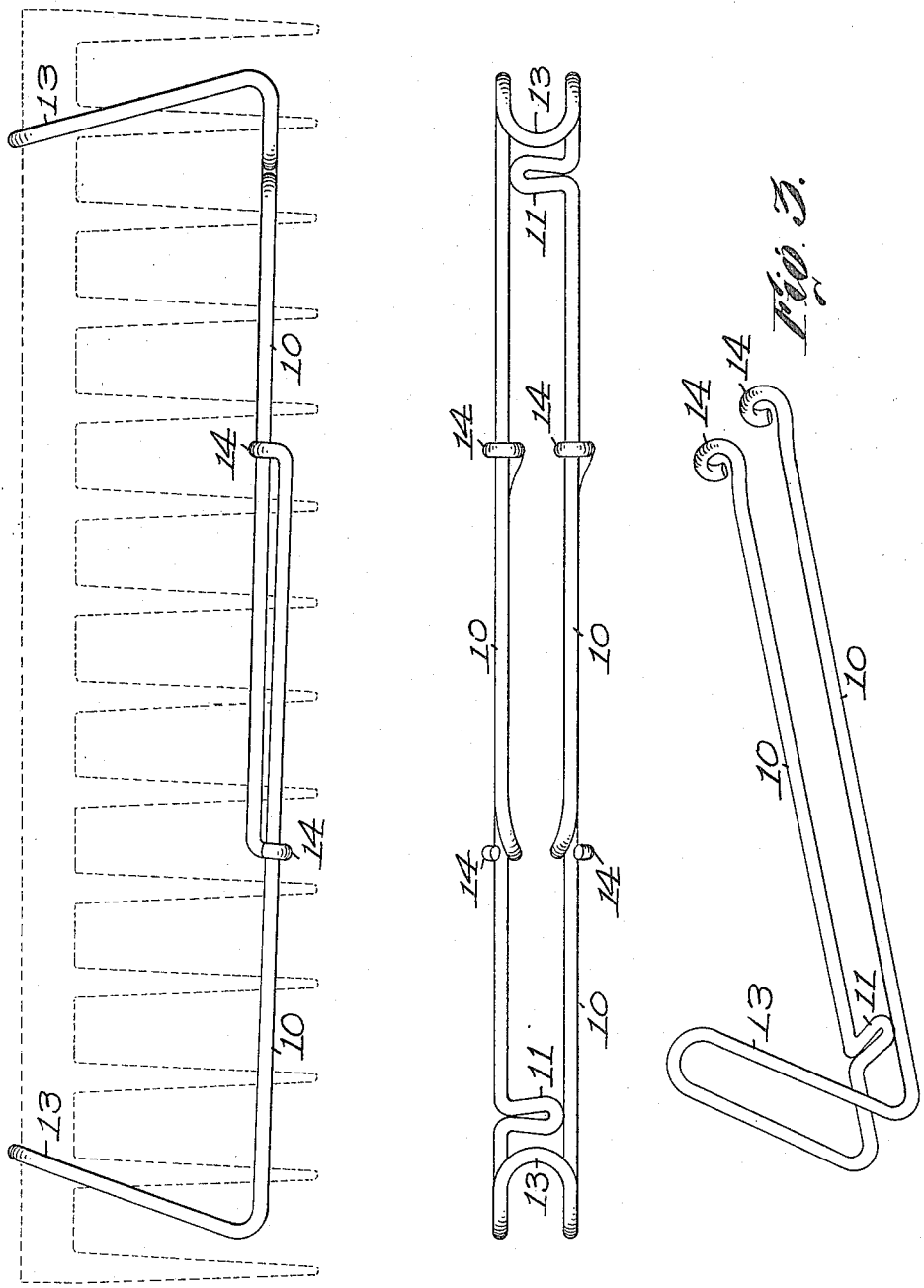

UNITED STATES PATENT OFFICE.

WILLIAM H. BACKUS, OF DANIELSON, CONNECTICUT.

RAKE-CLEANER.

1,158,022.  Specification of Letters Patent.  Patented Oct. 26, 1915.

Application filed September 24, 1914. Serial No. 863,360.

*To all whom it may concern:*

Be it known that I, WILLIAM H. BACKUS, a citizen of the United States, residing at Danielson, in the county of Windham and State of Connecticut, have invented a new and useful Rake-Cleaner, of which the following is a specification.

This invention relates to a rake cleaner adapted to be used for automatically removing leaves and other accumulations from between the teeth of a rake.

The principal objects of this invention are to provide a rake cleaner as a separate article of manufacture from the rake so that it can be sold on the market independently of any make of rake and can be applied to substantially all makes of ordinary iron or steel rakes at least; also to provide a construction which is longitudinally adjustable to permit of application to rakes of different lengths; in which the height of the body of the cleaner when in its lowermost position is readily adjustable to permit the use of a single article of this character with rakes of different lengths of teeth; also to provide an improved telescoping arrangement of the parts for securing the longitudinal adjustment; to provide an arrangement in which the parts are loosely engaged with each other so that when in use they will automatically yield and adjust themselves to the varying positions of the cleaner, thereby preventing binding; to provide a device in which the guides for the teeth can be adjusted readily to a position between any two teeth and more especially between the second and third teeth from each end so as to leave open spaces at the ends of the rake within which the end teeth of the rake are located so as to insure the proper working of the device even if the end teeth get bent, as often happens.

Further objects and advantages of the invention will appear hereinafter.

Reference is to be had to the accompanying drawings in which,

Figure 1 is an end elevation of a rake showing a preferred embodiment of this invention thereon; Fig. 2 is a plan of the cleaner; and Fig. 3 is a perspective view of one of the two elements of which the preferred form of the cleaner is made up.

As this cleaner is designed to be attached to rakes of varying makes and sizes, the rake to which it is shown as applied will not be described in detail, except to say that it is of ordinary construction, having straight teeth of the simplest character.

The cleaner is shown as made in two parts which are substantial duplicates of each other. Each one of these parts comprises two parallel longitudinal arms 10, one of them having a projection 11 extending inwardly so as substantially to meet the other arm. Beyond this projection the two arms are spaced apart and at their ends are bent upwardly at an angle to form supporting arms 13 which are integrally connected at the top to form a loop for supporting it on the top bar of the rake. The ends of the arms 10 are provided with eyes 14, that of each arm 10 being adapted to receive one of the arms 10 of the other member of the device. It is by this connection that a telescoping adjustment is secured when the two parts are connected together by means of these eyes. It is preferred to make these parts of wire so that each one of these members is composed of a single integral piece and the two are substantially duplicates of each other, so that they can be turned out in large quantities by means of a single set of bending dies and other tools.

In the use of the device the two parts are put together and adjusted telescopically until they are of such length that the projections 11 come between the second and third teeth at the two ends of the rake to which it is to be applied. The object of this is to have the cleaner guided between the second and third teeth instead of being guided in part or in whole by the first tooth. The first or end tooth is likely to be bent after a rake is used awhile and if that were depended upon for guiding the cleaner, the latter might become useless until adjusted. But the device can be used until that time with the projections 11 between the first two teeth, if desired.

When the device is to be put on the rake it is pulled out to a longer length than desired and one loop 14 is then placed over the back bar of the rake so as to support it and the device forced inwardly at that end over the first two teeth. This is possible because the projection 11 is resiliently held against the opposite bar 10 by the loop itself. As the ends of the projection are rounded it is possible to simply force the whole device inwardly over the teeth and it will automatically give when the pressure is sufficient and pass any desired number of teeth. After one end is secured in position in this way the other end is pushed in in the same way. If it is found that the cleaner, when at its lowermost position, is too near the ends of the teeth, the arms 13 can be bent down to a smaller angle with the horizontal, thus in effect raising the cleaner on the rake.

It will be seen that by this arrangement the article is complete in itself and not in any way dependent upon the form or shape of any particular make of rake. In other words, it is universally attachable to all ordinary garden or lawn rakes and to those of all standard sizes. It will be noticed that on account of the loose engagement of the two sections the parts readily yield relative to each other and adjust themselves to the varying positions of the cleaner. This makes it practically impossible for it to bind on the rake.

In the use of the device after it is once adjusted to position on the rake it will not need further adjustment unless the teeth which guide it get broken or bent, and in that case it can be moved along to be guided between any other two teeth. It is located at a point near the lower ends of the teeth, and as leaves and other matter come between the teeth under it, it will work up unless it cleans the teeth at every stroke. In that case the rake can easily be cleaned simply by lifting it up from the ground sufficiently to allow the leaves and the like to drop. If they do not drop readily for any reason, they can easily be made to do so by jarring the rake slightly.

Although I have illustrated and described only a single embodiment of the invention and shown it as applied only to a single form of rake, I am aware of the fact that many modifications can be made in the article itself and that it can be applied to many forms of rakes without departing from the scope of the invention as expressed in the claims. I do not wish, therefore, to be limited to all the details of construction herein shown and described, but What I do claim is:—

1. As an article of manufacture, a rake cleaner adapted to be attached to a rake and provided with means for changing its vertical distance from the back bar of the rake to accommodate teeth of different lengths, and means for adjusting it longitudinally to accommodate rakes of different lengths.

2. As an article of manufacture, a rake cleaner adapted to be attached to a rake and having means for guiding it up and down between two of the teeth of the rake, and provided with means for adjusting it longitudinally to accommodate rakes of different lengths.

3. As an article of manufacture, a longitudinally adjustable rake cleaner freely movable along the teeth of a rake to which it is attached.

4. In a rake cleaner, the combination of two members having telescoping connections with each other to permit longitudinal adjustment, said members also having inwardly extending projections for engaging between two of the teeth of a rake to form vertical guides.

5. In a rake cleaner, the combination of two members having telescoping connections with each other to permit longitudinal adjustment, said members also having means for engaging between two of the teeth of a rake to form vertical guides, the ends of said members being bent upwardly to form loops for supporting the cleaner from the back bar of a rake.

6. In a rake cleaner, the combination of two members having connections with each other to permit longitudinal adjustment, said members also having means for engaging between two of the teeth of a rake, the ends of said members being bent upwardly to form loops for supporting the cleaner from the back bar of the rake, said loops being adapted to be bent to different angles to raise or lower the body of the cleaner.

7. As an article of manufacture, a rake cleaner comprising two wire members located substantially in a horizontal plane, each having an integral loop extending to a position substantially to meet the other side of the member to form a guide for the cleaner in coöperation with the teeth of a rake.

8. As an article of manufacture, a rake cleaner comprising two wire members located substantially in a horizontal plane, each having a loop substantially meeting the other side of the member to form a guide for the cleaner, the ends of said members being bent upwardly and then downwardly to form loops for supporting the cleaner from the back bar of a rake.

9. As an article of manufacture, a rake cleaner comprising two wire members located substantially in a horizontal plane, their ends being bent upwardly and then downwardly to form loops for supporting the cleaner from the back bar of a rake, said loops being variable in inclination to permit vertical adjustment of the body of the cleaner.

10. As an article of manufacture, a rake cleaner comprising a pair of supporting end loops formed of wire, the lower ends of said loops being bent into horizontal position to form the body of the cleaner and being connected with each other, the horizontal portions being provided with inwardly extending convex bends to constitute guides, said bends each substantially engaging the opposite wire, whereby the resiliency of the wire will permit of the wires being separated to allow the guides to be moved over a tooth into the next space.

In testimony whereof I have hereunto set my hand, in the presence of two subscribing witnesses.

WILLIAM H. BACKUS.

Witnesses:
V. E. SHAW,
LOUIS G. MASSICOTTE.